(12) United States Patent
Ohno et al.

(10) Patent No.: US 9,062,145 B2
(45) Date of Patent: Jun. 23, 2015

(54) CURABLE RESIN COMPOSITION, CURABLE FILM AND THEIR CURED PRODUCTS

(75) Inventors: Daisuke Ohno, Tokyo (JP); Kenji Ishii, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 1035 days.

(21) Appl. No.: 12/153,677

(22) Filed: May 22, 2008

(65) Prior Publication Data

US 2008/0300350 A1 Dec. 4, 2008

(30) Foreign Application Priority Data

May 31, 2007 (JP) ................................. 2007-144462
Dec. 11, 2007 (JP) ................................. 2007-319601

(51) Int. Cl.
| | | |
|---|---|---|
| C08F 283/06 | (2006.01) | |
| C08F 290/06 | (2006.01) | |
| C08F 290/02 | (2006.01) | |
| C08F 299/02 | (2006.01) | |

(52) U.S. Cl.
CPC ........... *C08F 290/062* (2013.01); *C08F 283/06* (2013.01); *C08F 290/06* (2013.01); *C08F 299/02* (2013.01)

(58) Field of Classification Search
CPC .. C08F 283/06; C08F 290/06; C08F 290/062; C08F 290/02
USPC ........................................................ 524/147
See application file for complete search history.

(56) References Cited

U.S. PATENT DOCUMENTS

| 4,298,720 A * | 11/1981 | Yamazaki et al. ............. 526/262 |
| 2003/0194562 A1* | 10/2003 | Ishii et al. ..................... 428/413 |
| 2004/0235992 A1* | 11/2004 | Okada et al. .................. 524/115 |
| 2006/0041068 A1* | 2/2006 | Ohno et al. .................... 525/191 |
| 2006/0270768 A1 | 11/2006 | Zhu et al. |
| 2007/0129502 A1* | 6/2007 | Kawabe et al. ............... 525/391 |

FOREIGN PATENT DOCUMENTS

| CN | 1737050 | 2/2006 |
| EP | 0 542 232 | 11/1992 |
| EP | 1 384 733 | 1/2004 |
| EP | 1 632 534 | 3/2006 |
| JP | 56-133355 | 10/1981 |
| JP | 03-70716 | 3/1991 |
| JP | 05-310891 | 11/1993 |
| JP | 09-296105 | 11/1997 |
| JP | 2004-059644 | 2/2004 |
| JP | 2004-067727 | 3/2004 |
| JP | 2005-126523 | 5/2005 |
| JP | 2006-063297 | 3/2006 |
| JP | 2006-083364 | 3/2006 |
| JP | 2006-89683 | 4/2006 |
| KR | 10-2006-0053172 | 5/2006 |
| WO | WO 2005073264 A1 * | 8/2005 ............ C08F 299/02 |

OTHER PUBLICATIONS

Taiwanese Office Action issued Aug. 4, 2012 in corresponding Taiwanese Application No. 97119495, with English translation.
Japanese Office Action issued Oct. 30, 2012 in corresponding Japanese Patent Application No. 2008-127211, with English translation.

* cited by examiner

*Primary Examiner* — Mark Kaucher
(74) *Attorney, Agent, or Firm* — Wenderoth, Lind & Ponack, L.L.P.

(57) ABSTRACT

A curable resin composition containing a specific vinyl compound obtained by vinylation of a terminal of a bifunctional phenylene ether oligomer having a polyphenylene ether structure in a molecule and a specific bismaleimide compound having at least two maleimide groups in a molecule, a curable film comprising the above composition, a cured product obtained by curing the above composition, and a film obtained by curing the curable film. The above resin composition is excellent in curability even in the presence of oxygen, is curable at a low temperature and is capable of giving a cured product having a low dielectric constant, a low dielectric loss tangent, high heat resistance, excellent mechanical properties, excellent chemical resistance and excellent flame retardancy.

14 Claims, No Drawings

CURABLE RESIN COMPOSITION, CURABLE FILM AND THEIR CURED PRODUCTS

FIELD OF THE INVENTION

The present invention relates to a curable resin composition which can be cured in the presence of oxygen or at a low temperature and can give a cured product excellent in low dielectric characteristics, heat resistance, mechanical properties and chemical resistance and to a cured product obtained by curing the above resin composition and a curable film or a film, each of which uses the resin composition. The curable resin composition, the curable film, the cured product, and the film of the present invention are suitable for use in the field of electronic materials such as resins for printed wiring boards, sealing resins for semiconductors, interlayer insulating materials for semiconductors and insulating materials for electronic parts.

BACKGROUND OF THE INVENTION

Conventionally, curable resins have been widely used for adhesion, casting, coating, impregnation, lamination, molding compound, etc. However, the curable resins are used in so various fields that conventionally-known curable resins are not satisfactory under some use environments or some use conditions.

In the fields of information communications and calculating machines, for example, the signal band of information communication apparatuses such as PHS or mobile phones and the CPU clock time of computers reach to the GHz band. For the purpose of controlling damping of electric signals being due to an insulator, materials having a low dielectric constant and a low dielectric loss tangent are desired for insulators. As such materials, fluorine-contained resins, polyolefin resins, polystyrene resins, polyphenylene ether resins and vinylbenzyl ether resins are proposed (for example, see JP-A-7-188362, JP-A-2004-83680, Japanese Patent No. 3414556 and JP-A-2003-306591).

However, though these materials are excellent in dielectric characteristics, they do not necessarily meet all demands for physical properties necessary as electronic parts, other than dielectric characteristics, such as heat resistance, chemical resistance and mechanical properties.

In the fields of printed wiring boards and semiconductor packages, for example, the temperature at the time of soldering increases due to recent introduction of lead-free solder. For securing higher mounting reliability, it is required that constituent materials of printed wiring boards, semiconductor packages and electronic parts have high heat resistance, low water absorption properties, low thermal expansibility, etc. With regard to a curing step of curable resins used for these, improvements in productivity, such as curing in an oven in the presence of oxygen and curing at lower temperatures, are strongly demanded. Further, flame retardancy is generally necessary to electronic parts in view of safety of articles.

The present inventors have developed vinyl compound derivatives of bifunctional phenylene ether oligomers and curable resin compositions comprising such derivatives for the purpose of meeting the above demands for low dielectric characteristics, heat resistance, chemical resistance, low water absorption properties, etc. (for example, see JP-A-2004-59644 and JP-A-2006-83364). The above derivatives and the above curable resin compositions are excellent in curability under curing conditions where they are not always in contact with oxygen during curing, for instance, pressing molding where the resin compositions are placed in molds or curing in an inert oven where a gaseous phase has been replaced with nitrogen. Under such conditions, cured products excellent in low dielectric characteristics, heat resistance and mechanical properties can be obtained. However, for example, when the derivatives and the above curable resin compositions in the form of a coating film or a film are cured using an oven having air atmosphere under conditions where they are always in contact with oxygen, they are not sufficiently cured. Therefore, improvement is desired. Even in uses where curing is carried out in the state in which they are not always in contact with oxygen, for instance, under nitrogen, under reduced pressure or under pressure, a material curable at a lower temperature is desired in view of improvement in productivity.

SUMMARY OF THE INVENTION

It is an object of the present invention to provide a curable resin composition which gives a cured product having a low dielectric constant, a low dielectric loss tangent, excellent heat resistance, excellent mechanical properties, excellent chemical resistance and excellent flame retardancy and is excellent in curability even in the presence of oxygen and able to be cured at a low temperature, a curable film comprising the above composition, a cured product obtained by curing the above composition and a film obtained by curing the above composition into a film form.

The present inventors have made diligent studies for attaining the above object and as a result found the following. When a terminal vinyl compound of a bifunctional phenylene ether oligomer having a polyphenylene ether structure in a molecule is combined with a bismaleimide compound having a specific structure, the resultant composition is curable even in the presence of oxygen, it is possible to decrease curing temperature and a cured product obtained therefrom has a low dielectric constant, a low dielectric loss tangent, a high grass transition temperature (Tg), high strength and excellent chemical resistance. On the basis of the above finding, the present inventors have completed the present invention.

That is, the present invention relates to a curable resin composition containing as essential components a vinyl compound (a) represented by the formula (1) and one maleimide compound (b) or at least two maleimide compounds (b) selected from the group consisting of maleimide compounds (b) represented by the formulae (5) to (8), provided that the curable resin composition may contain a mixture of at least two kinds of compounds (a) of the formula (1) which differ in structure from each other. The present invention relates to a curable resin composition obtained by further incorporating at least one member selected from the group consisting of a styrenic thermoplastic elastomer (c), a flame retardant (d) and a filler (e) into the above curable resin composition.

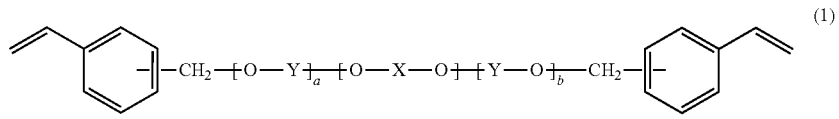

(1)

wherein —(O—X—O)— represents a moiety of the formula (2) or the formula (3), —(Y—O)— represents an arrangement of a moiety of the formula (4) or a random arrangement of at least two kinds of moieties of the formula (4), and each of a and b is an integer of from 0 to 100, provided that at least one of a and b is not 0.

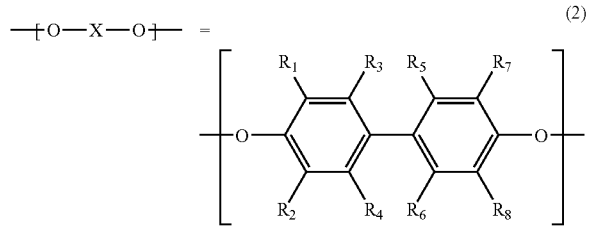

(2)

wherein $R_1$, $R_2$, $R_3$, $R_7$ and $R_8$ are the same or different and represent a halogen atom, an alkyl group having 6 or less carbon atoms or a phenyl group and $R_4$, $R_5$ and $R_6$ are the same or different and represent a hydrogen atom, a halogen atom, an alkyl group having 6 or less carbon atoms or a phenyl group.

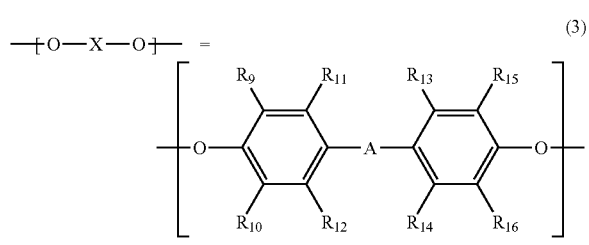

(3)

wherein $R_9$, $R_{10}$, $R_{11}$, $R_{12}$, $R_{13}$, $R_{14}$, $R_{15}$ and $R_{16}$ are the same or different and represent a hydrogen atom, a halogen atom, an alkyl group having 6 or less carbon atoms or a phenyl group and -A- represents a linear, branched or cyclic bivalent hydrocarbon group having 20 or less carbon atoms.

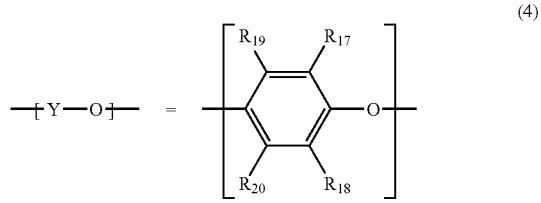

(4)

wherein $R_{17}$ and $R_{18}$ are the same or different and represent a halogen atom, an alkyl group having 6 or less carbon atoms or a phenyl group and $R_{19}$ and $R_{20}$ are the same or different and represent a hydrogen atom, a halogen atom, an alkyl group having 6 or less carbon atoms or a phenyl group.

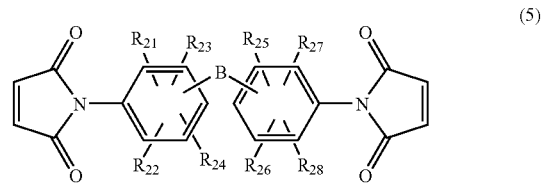

(5)

wherein $R_{21}$ to $R_{28}$ are the same or different and represent a hydrogen atom or an alkyl group having 6 or less carbon atoms and B represents a single bond, a bivalent hydrocarbon group having 20 or less carbon atoms or an oxygen atom.

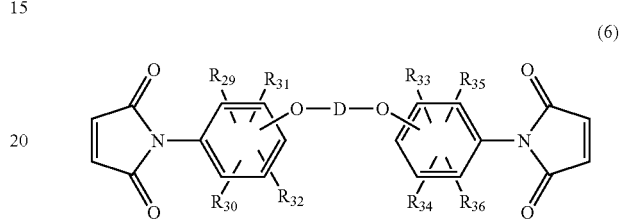

(6)

wherein $R_{29}$ to $R_{36}$ are the same or different and represent a hydrogen atom or an alkyl group having 6 or less carbon atoms and D represents a bivalent hydrocarbon group having 20 or less carbon atoms.

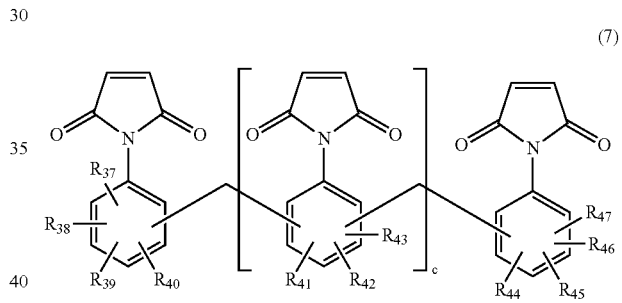

(7)

wherein $R_{37}$ to $R_{47}$ are the same or different and represent a hydrogen atom or an alkyl group having 6 or less carbon atoms and c is an integer of 1 to 20.

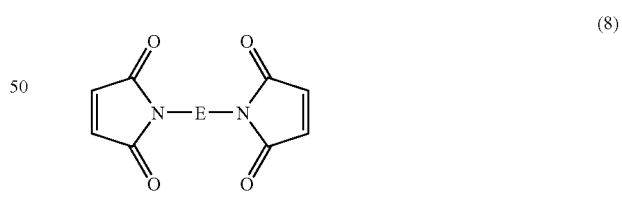

(8)

wherein E represents a bivalent aliphatic hydrocarbon group having 20 or less carbon atoms.

Further, the present invention relates to a cured product obtained by curing the above resin composition, a curable film obtained by processing the above resin composition into a film form, and a film obtained by curing the above resin composition into a film form.

Effect of the Invention

Owing to the use of the curable resin composition of the present invention, curing can be carried out in the presence of oxygen. Therefore, especially, a cured product in the form of a coating film or a film can be easily obtained. Further, since curing temperature can be decreased, productivity increases. A cured product obtained from the resin composition of the present invention is excellent in low dielectric characteristics, high heat resistance, chemical resistance and mechanical properties, so that it is expected that the resin composition of the present invention be applied to insulating materials for high-frequency electrical parts, insulating materials for semiconductors, materials for buildup wiring boards, materials for copper-clad laminates, coating materials, coatings, adhesives, films for condensers, die attach films, cover lay films, electrically conductive pastes, solder resists, materials for flexible wiring boards, fiber-reinforced plastics, etc. Thus, industrial significance thereof is remarkably high.

DETAILED DESCRIPTION OF THE INVENTION

The vinyl compound (a) represented by the formula (1) used in the curable resin composition of the present invention is not specially limited so long as it is a vinyl compound represented by the formula (1) wherein —(O—X—O)— represents a moiety of the formula (2) in which $R_1$, $R_2$, $R_3$, $R_7$ and $R_8$ are the same or different and represent a halogen atom, an alkyl group having 6 or less carbon atoms or a phenyl group and $R_4$, $R_5$ and $R_6$ are the same or different and represent a hydrogen atom, a halogen atom, an alkyl group having 6 or less carbon atoms or a phenyl group, or a moiety of the formula (3) in which $R_9$, $R_{10}$, $R_{11}$, $R_{12}$, $R_{13}$, $R_{14}$, $R_{15}$ and $R_{16}$ are the same or different and represent a hydrogen atom, a halogen atom, an alkyl group having 6 or less carbon atoms or a phenyl group and -A- represents a linear, branched or cyclic bivalent hydrocarbon group having 20 or less carbon atoms; —(Y—O)— represents an arrangement of a moiety of the formula (4) or a random arrangement of at least two kinds of moieties of the formula (4) in which $R_{17}$ and $R_{18}$ are the same or different and represent a halogen atom, an alkyl group having 6 or less carbon atoms or a phenyl group and $R_{19}$ and $R_{20}$ are the same or different and represent a hydrogen atom, a halogen atom, an alkyl group having 6 or less carbon atoms or a phenyl group; and each of a and b is an integer of 0 to 100, provided that at least one of a and b is not 0. Further, at least two kinds of vinyl compounds (a) having different structures can be contained in the curable resin composition.

Examples of -A- in the formula (3) include bivalent hydrocarbon groups such as methylene, ethylidene, 1-methylethylidene, 1,1-propylidene, 1,4-phenylenebis(1-methylethylidene), 1,3-phenylenebis(1-methylethylidene), cyclohexylidene, phenylmethylene, naphthyl methylene and 1-phenylethylidene. -A- in the formula (3) is not limited to these examples.

The vinyl compound (a) in the present invention is preferably a vinyl compound (a) wherein $R_1$, $R_2$, $R_3$, $R_7$, $R_8$, $R_{17}$ and $R_{18}$ are alkyl groups having 3 or less carbon atoms and $R_4$, $R_5$, $R_6$, $R_9$, $R_{10}$, $R_{11}$, $R_{12}$, $R_{13}$, $R_{14}$, $R_{15}$, $R_{16}$, $R_{19}$ and $R_{20}$ are hydrogen atoms or alkyl groups having 3 or less carbon atoms, particularly more preferably a vinyl compound (a) wherein —(O—X—O)— represented by the formula (2) or formula (3) is a moiety of the formula (9), the formula (10) or the formula (11), and —(Y—O)— represented by the formula (4) is an arrangement of a moiety of the formula (12), an arrangement of a moiety of the formula (13) or a random arrangement of moieties of the formula (12) and the formula (13).

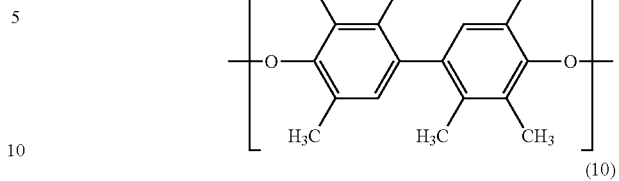
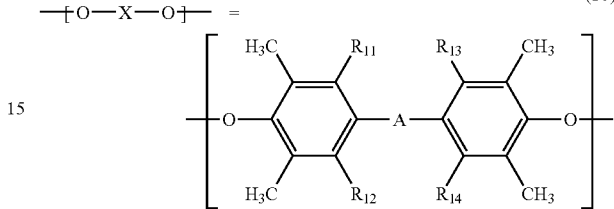

wherein $R_{11}$, $R_{12}$, $R_{13}$ and $R_{14}$ are the same or different and represent a hydrogen atom or a methyl group and -A- represents a linear, branched or cyclic bivalent hydrocarbon group having 20 or less carbon atoms.

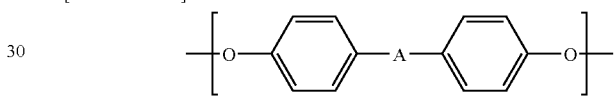

wherein -A- represents a linear, branched or cyclic bivalent hydrocarbon group having 20 or less carbon atoms.

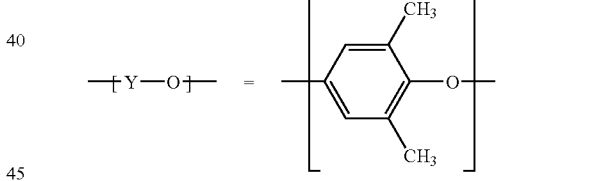
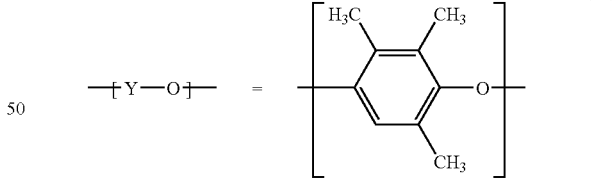

With regard to the molecular weight of the vinyl compound (a), the number average molecular weight thereof is preferably 500 to 3,000 and the molecular weight distribution (weight average molecular weight/number average molecular weight) is preferably in the range of 1 to 3. When the number average molecular weight is less than 500, a coating film of the curable resin composition is apt to be sticky. When the number average molecular weight exceeds 3,000, the solubility of the resin composition in a solvent decreases. When the molecular weight distribution exceeds 3, in some cases, the curable resin composition is poor in solvent solubility and the glass transition temperature of a cured product of the curable resin composition decreases. The process for producing the vinyl compound (a) is not specially limited. For example, the vinyl compound (a) is produced by vinylbenzyl etherification of a terminal phenolic hydroxyl group of a bifunctional phenylene ether oligomer which is obtained by oxidation-coupling of a bifunctional phenol compound and a monofunctional phenol compound.

The bifunctional phenylene ether oligomer can be produced by, for example, dissolving a bifunctional phenol compound, a monofunctional phenol compound and a catalyst in a solvent and then introducing oxygen into the resultant solution under heat with stirring.

Examples of the bifunctional phenol compound include 2,2',3,3',5,5'-hexamethyl-(1,1'-biphenyl)-4,4'-diol, 4,4'-methylenebis(2,6-dimethylphenol), 4,4'-dihydroxyphenyl methane, and 2,2-bis(4-hydroxyphenyl)propane. The bifunctional phenol compound is not limited to these examples.

The monofunctional phenol compound is typically 2,6-dimethylphenol or 2,3,6-trimethylphenol. The monofunctional phenol compound is not limited to these examples.

The catalyst is, for example, a combination of a copper salt and an amine. Examples of the copper salt include CuCl, CuBr, CuI, $CuCl_2$ and $CuBr_2$. Examples of the amine include di-n-butylamine, n-butyldimethylamine, N,N'-di-t-butylethylenediamine, N,N,N',N'-tetramethylethylenediamine, pyridine, piperidine and imidazole. The catalyst is not limited to these examples.

Examples of the solvent include toluene, methanol, methyl ethyl ketone and xylene. The solvent is not limited to these examples.

As a method of the vinylbenzyl etherification of a terminal phenolic hydroxyl group of the bifunctional phenylene ether oligomer, for example, its production can be carried out by dissolving a bifunctional phenylene ether oligomer and vinylbenzyl chloride in a solvent to obtain a solution, adding a base to the solution under heat with stirring to allow the components to react, and then solidifying a resin.

The vinylbenzyl chloride includes o-vinylbenzylchloride, m-vinylbenzylchloride, p-vinylbenzylchloride, and mixtures of these.

Examples of the base include sodium hydroxide, potassium hydroxide, sodium methoxide and sodium ethoxide. The base is not limited to these examples.

An acid can be used for neutralizing the base which remains after the reaction. Examples of the acid include hydrochloric acid, sulfuric acid, phosphoric acid, boric acid and nitric acid. The acid is not limited to these examples.

Examples of the solvent for the reaction include toluene, xylene, acetone, methyl ethyl ketone, methyl isobutyl ketone, dimethylformamide, dimethylacetamide, methylene chloride and chloroform. The solvent for the reaction is not limited to these examples.

As a method of the solidification, there are a method in which solidification by drying is carried out by evaporation of the solvent and a method in which a reaction liquid is mixed with a poor solvent to precipitate a solid. It is not limited to these methods.

The maleimide compound (b) used in the curable resin composition of the present invention is not specially limited so long as it is selected from maleimide compounds represented by the formulae (5) to (8) wherein $R_{21}$ to $R_{47}$ are the same or different and represent a hydrogen atom or an alkyl group having 6 or less carbon atoms, B represents a single bond, a bivalent hydrocarbon group having 20 or less carbon atoms or an oxygen atom, D represents a bivalent hydrocarbon group having 20 or less carbon atoms, E represents a bivalent aliphatic hydrocarbon group having 20 or less carbon atoms and c is an integer of 1 to 20. In the formulae (5) to (8), preferably, $R_{21}$ to $R_{36}$ are the same or different and represent a hydrogen atom, an ethyl group or a methyl group, $R_{37}$ to $R_{47}$ represent a hydrogen atom and E represents an aliphatic hydrocarbon group having 10 or less carbon atoms.

Examples of the bivalent hydrocarbon group as —B— of the formula (5) include methylene, ethylidene, 1-methylethylidene, 1,1-propylidene, 1,4-phenylenebis(1-methylethylidene), 1,3-phenylenebis(1-methylethylidene), cyclohexylidene, phenylmethylene, naphthylmethylene, 1-phenylethylidene, 1,3-phenylene and 1,4-phenylene. It is not limited to these examples.

Examples of -D- in the formula (6) include 1-methylethylidenedi(-4,1-phenylene), methylenedi (-4,1-phenylene), 1,3-phenylene and 1,4-phenylene. It is not limited to these examples.

Examples of -E- in the formula (8) include ethylene, 1,4-butylene, 1,6-hexylene and 2,2,4-trimethyl-1,6-hexylene. It is not limited to these examples.

The maleimide compound (b) may be used singly. Further, two or more maleimide compounds (b) may be used in combination.

Examples of the styrenic thermoplastic elastomer (c) to be used in the curable resin composition of the present invention include a styrene butadiene styrene copolymer (SBS), a hydrogenated styrene butadiene styrene copolymer (SEBS), a styrene isoprene styrene copolymer (SIS), a hydrogenated styrene isoprene styrene copolymer, a styrene (butadiene/isoprene) styrene copolymer and a hydrogenated styrene (butadiene/isoprene) styrene copolymer. Of these, the use of a hydrogenated styrene butadiene styrene copolymer (SEBS), a hydrogenated styrene isoprene styrene copolymer or a hydrogenated styrene (butadiene/isoprene) styrene copolymer is preferred, since a cured product having a high glass transition temperature can be obtained and heat resistance is improved.

The content of styrene in the styrenic thermoplastic elastomer (c) is not specially limited. The styrene content is preferably 10 to 70 wt %, more preferably 20 to 50 wt %, for obtaining cured products having higher heat resistance. Further, the weight average molecular weight of the styrenic thermoplastic elastomer (c) is preferably 10,000 to 300,000. When it is too small, a coating film of a cured product has a crack in some cases. When it is too large, it becomes difficult to mix the styrenic thermoplastic elastomer (c) with the vinyl compound (a) or the maleimide compound (b).

The mixing ratio of the vinyl compound (a) and the maleimide compound (b) in the curable resin composition of the present invention is not specially limited. When either of the amounts of the vinyl compound (a) and the maleimide compound (b) is too large, it is impossible to obtain desired curability. Therefore, the molar ratio of a vinyl group of the vinyl compound (a) and a maleimide group of the maleimide compound (b) is preferably 1:0.1 to 1:5 (vinyl group:maleimide group), more preferably 1:0.5 to 1:2.

The amount of the styrenic thermoplastic elastomer (c) contained in the curable resin composition of the present invention is not specially limited. When the amount thereof is too large, desired curability cannot be obtained. Therefore, the weight ratio of (vinyl compound (a)+maleimide compound (b)): elastomer (c) is preferably 100:0 to 30:70, more preferably 100:0 to 50:50.

The flame retardant (d) to be used in the present invention is selected from known flame retardants. Examples of the flame retardant (d) include halogen flame retardants such as a brominated epoxy resin, brominated polycarbonate, brominated polystyrene, brominated styrene, brominated phthalimide, tetrabromobisphenol A, pentabromobenzyl(meth)acrylate, pentabromotoluene, tribromophenol, hexabromobenzene, decabromodiphenyl ether, bis-1,2-pentabromophenylethane, chlorinated polystyrene and chlorinated paraffin; phosphoric flame retardants such as red phosphorus, tricresyl phosphate, triphenyl phosphate, cresyl diphenyl phosphate, trixylenyl phosphate, trialkyl phosphate, dialkyl phosphate, tris(chloroethyl)phosphate, phosphazene, 1,3-phenylenebis(2,6-dixylenylphosphate), and 10-(2,5-dihydroxyphenyl)-10H-9-oxa-10-phosphaphenanthrene-10-oxide; inorganic flame retardants such as aluminum hydroxide, magnesium hydroxide, heat-treated aluminum hydroxide obtained by heat-treating aluminum hydroxide and reducing part of crystal water, boehmite, zinc borate and antimony trioxide; and silicone flame retardants such as silicone rubbers and silicone resins. These flame retardants may be used alone or in combination. Of these, 1,3-phenylenebis(2,6-dixylenylphosphate) is preferred since it does not impair low dielectric characteristics. The content of phosphorus in the resin composition is preferably 0.1 to 5 wt %.

The filler (e) to be used in the present invention is selected from known fillers. Examples of the filler (e) include fibrous fillers such as a glass fiber, a carbon fiber, an aramid fiber, a silicone carbide fiber, an alumina fiber, a boron fiber and a liquid crystalline polyester fiber; inorganic whiskers such as silicone carbide, silicon nitride, magnesium oxide, potassium titanate and aluminoborate; inorganic acicular fillers such as wollastonite, sonolite, a phosphate fiber and sepiolite, inorganic fillers such as pulverized silica, fused silica, talc, alumina, barium titanate, mica, glass beads, barium sulfate and glass powders; organic fillers such as particulate polymers obtainable by crosslinking of (meth) acrylic acid ester, styrene, etc.; and carbon black. These fillers can be used alone or in combination. The filler (e) can decrease the thermal expansion coefficient of the curable resin composition. Particularly, silica is preferred since it can decrease the thermal expansion coefficient without largely impairing the low dielectric characteristics. The amount of the filler (e) in the resin composition is preferably 0.1 to 80 wt %, more preferably 10 to 70 Wt %, since coating film strength decreases when it is too large.

The method of mixing the curable resin composition of the present invention is not specially limited. For example, there are a method in which a vinyl compound (a), a maleimide compound (b), a styrenic thermoplastic elastomer (c), a flame retardant (d) and a filler (e) are dissolved and dispersed in a solvent to obtain a mixture and then the solvent is removed from the mixture by drying and a method in which a vinyl compound (a), a maleimide compound (b), a styrenic thermoplastic elastomer (c), a flame retardant (d) and a filler (e) are mixed using a kneading machine such as a Labplast mill.

The curable resin composition itself of the present invention is cured even in the presence of oxygen by means of heating. It is possible to add a heat-curing catalyst for the purpose of further accelerating a curing speed and thereby improving workability and economic efficiency. As the heat-curing catalyst, it is possible to use a substance which generates a cationic or radical active species, which is able to initiate the polymerization of a vinyl group, by the use of heating or light. Examples of a cationic polymerization initiator include diallyl iodonium salt, triallyl sulfonium salt and aliphatic sulfonium salt each of which uses $BF_4$, $PF_6$, $AsF_6$ or $SbF_6$ as a pairing anion. Commercially available products can be used. Examples thereof include SP70, SP172 and CP66, supplied by ADEKA K.K., CI2855 and CI2823 supplied by Nippon Soda Co., Ltd., and SI100L and SI150L supplied by Sanshin Chemical Industry Co., Ltd. A radical polymerization initiator includes benzoin compounds such as benzoin and benzoin methyl; acetophenone compounds such as acetophenone and 2,2-dimethoxy-2-phenylacetophenone; thioxanthone compounds such as thioxanthone and 2,4-diethylthioxanthone; bisazido compounds such as 4,4'-diazidochalcone, 2,6-bis(4'-azidobenzal)cyclohexanone and 4,4'-diazidobenzophenone; azo compounds such as azobisisobutyronitrile, 2,2-azobispropane and hydrazone; and organic peroxides such as 2,5-dimethyl-2,5-di(t-butylperoxy)hexane, 2,5-dimethyl-2,5-di(t-butylperoxy)hexyne-3 and dicumyl peroxide. These curing catalysts can be used alone or in combination.

It is also possible to add a polymerization inhibitor to the curable resin composition of the present invention in order to improve preservation stability. The polymerization inhibitor can be selected from known polymerization inhibitors. Examples thereof include quinones such as hydroquinone, methyl hydroquinone, p-benzoquinone, chloranil and trimethylquinone, and aromatic diols. These polymerization inhibitors may be used alone or in combination.

The curable resin composition of the present invention can contain a known coupling agent, a thermosetting resin, a thermoplastic resin, a photocurable resin, a dye, a pigment, a thickener, a lubricant, a defoaming agent, an ultraviolet absorber, etc., as required, for adjusting physical properties.

Examples of the coupling agent include silane coupling agents such as vinyltrichlorosilane, vinyltriethoxysilane, vinyltrimethoxysilane, γ-methacryloxypropyltrimethoxysilane, β(3,4-epoxycyclohexyl)ethyltrimethoxysilane, γ-glycidoxypropylmethyldiethoxysilane, N-β(aminoethyl) γ-aminopropylmethylmethoxysilane, γ-aminopropyltriethoxysilane, N-phenyl-γ-aminopropyltrimethoxysilane, γ-mercaptopropyltrimethoxysilane and γ-chloropropyltrimethoxysilane, titanate coupling agents, aluminum coupling agents, zircoaluminate coupling agents, silicone coupling agents and fluorine coupling agents. These coupling agents may be used alone or in combination.

Examples of the thermosetting resin include epoxy resins such as bisphenol A type epoxy, bisphenol F type epoxy, phenol novolak type epoxy, cresol novolak type epoxy and dicyclopentadiene novolak type epoxy; (meth)acrylates such as bisphenol A type epoxy(meth)acrylate, phenol novolak type epoxy(meth)acrylate, trimethylolpropane tri(meth)acrylate and dipentaerythritol hexa(meth)acrylate; vinyl compounds such as divinylbenzene, divinylnaphthalene, divinylbenezene polymer, divinylnaphthalene polymer and vinylbenzyl ether of hexamethylbiphenol; allyl compounds such as triallyl cyanurate, triallyl isocyanurate, allyl-modified bisphenol A and allyl-modified polyphenylene ether; cyanate resins such as bisphenol A dicyanate, tetramethylbisphenol F dicyanate, bisphenol M dicyanate, and phenol novolak cyanates; an oxetane resin; a benzocyclobutene resin and a benzoxazine resin. These thermosetting resins can be used alone or in combination.

Examples of the thermoplastic resin include polyamidimide, polyimide, polybutadiene, polyethylene, polystyrene, polycarbonate, a phenoxy resin, polyisoprene, polyester, polyvinyl butyral and polybutadiene.

A curable resin composition solution obtainable by the present invention will be explained. The curable resin composition solution of the present invention can be obtained by dissolving and dispersing the curable resin composition of the present invention in a solvent.

Examples of the solvent include acetone, methyl ethyl ketone, methyl isobutyl ketone, cyclohexanone, cyclopentanone, ethylene glycol monomethyl ether acetate, propylene glycol dimethyl ether, cyclohexane, benzene, toluene, xylene, tetrahydrofuran, dioxane, cyclopentyl methyl ether, N,N-dimethylformamide, N,N-dimethylacetamide, N-methylpyrrolidone, dimethylsulfoxide, methylene chloride, chloroform, 1,2-dichloroethane, ethyl acetate, butyl acetate and γ-butyrolactone. The solvent is not limited to these examples. These solvents can be used alone or in combination.

The method of dissolution is, for example, a method in which the curable resin composition and the solvent are stirred under heat in a vessel having a stirrer. The dissolution method is not limited to the above method. The heating temperature is preferably 30° C. to 100° C.

The curable resin composition solution of the present invention is used for obtaining a curable resin composition by removing the solvent by drying. Further, the curable resin composition solution of the present invention is usable since it can be used for a resist, a prepreg or the like.

For example, the prepreg is obtained by impregnating a solution of the curable resin composition of the present invention in a solvent into a glass cloth, an aramid nonwoven fabric, a liquid crystalline polyester nonwoven fabric or the like, and removing the solvent by drying. The above prepreg can be used as a material for a copper-clad laminate. Further, when a solution of the curable resin composition of the present invention in a solvent is applied to a substrate in which a circuit has been produced, it can be used as a solder resist or an interlayer insulation layer of a buildup wiring board.

The cured product of the present invention can be obtained by curing the curable resin composition of the present invention. As a method of curing, for example, there are a method in which the resin composition is heated in a mold, a method in which a solution of the resin composition is applied to a base material such as a glass plate, an SUS plate or FRP, a solvent is removed by drying and then heating is carried out with an oven, and a method in which the resin composition in a solid state is molten without using a solvent, the molten resin composition is cast in a mold and it is heated. Although the curable resin composition of the present invention is capable to undergo curing in the presence of oxygen, it is possible to apply pressure or use an inert gas such as nitrogen or argon as a curing atmosphere, if required.

The temperature for curing is preferably 100 to 250° C. and the period of time for curing is preferably 0.1 to 5 hours.

Further, it is possible to incorporate a photopolymerization initiator into the resin composition of the present invention and cure the resultant resin composition by means of ultraviolet ray irradiation, as required. Examples of the photopolymerization initiator include α-diketones such as benzyl and diacetyl, acyloin ethers such as benzoyl ethyl ether and benzoyl isopropyl ether, thioxanthones such as thioxanthone, 2,4-diethylthioxanthone and 2-isopropylthioxanthone, benzophenones such as benzophenone and 4,4'-bis(dimethylamino)benzophenone, acetophenones such as acetophenone, 2,2'-dimethoxy-2-phenylacetophenone and β-methoxyacetophenone, and aminoacetophenones such as 2-methyl-1-[4-(methylthio)phenyl]-2-morpholinopropane-1-one and 2-benzyl-2-dimethylamino-1-(-4-morpholinophenyl)-butanone-1.

Then, a base-material-attached curable resin composition obtainable according to the present invention will be explained. The base-material-attached curable resin composition of the present invention is obtained by applying the curable resin composition of the present invention to a base material. Examples of the base material include organic film base materials such as a polyethylene film, a polypropylene film, a polycarbonate film, a polyethylene terephthalate film, an ethylene tetrafluoroethylene copolymer film, release films obtained by applying a releasing agent to surfaces of the above films, and a polyimide film, conductive foils such as a copper foil and an aluminum foil, and plate-like base materials such as a glass plate, a SUS plate and FRP. As the method of application, for example, there is a method in which the curable resin composition of the present invention is dissolved in a solvent, the resultant solution is applied to a base material with a bar coater, a die coater, a doctor blade, a baker applicator or the like, and the solvent is removed by drying.

Drying conditions for the removal of the solvent by drying are not specially limited. When a low temperature is adopted, the solvent is apt to remain in the base-material-attached curable resin composition. When a high temperature is adopted, curing of the resin composition advances. Therefore, the drying is preferably carried out at a temperature of 20° C. to 150° C. for 1 to 90 minutes. The thickness of a resin layer can be adjusted by means of the concentration of the resin composition solution and the thickness of the application of the resin composition. When the thickness of the application is too large, the solvent is apt to remain at the time of drying. Therefore, the thickness is preferably 0.1 to 500 μm.

The base-material-attached curable resin composition of the present invention can be used as an insulating layer of a printed wiring board and a material for semiconductor packages. For example, a solution of the curable resin composition of the present invention in a solvent is applied to a copper foil used as the base material and then the applied solution is dried to obtain a resin-attached copper foil. A solution of the curable resin composition of the present invention in a solvent is applied to a separable plastic film used as the base material and then the applied solution is dried to obtain a film for buildup, a dry film solder resist or a die attach film. The solvent can be dried and removed by heating at a temperature of 20° C. to 150° C. for 1 to 90 minutes. Further, the curable resin composition can be used in a non-cured state only after the removal of solvent. Further, it is possible to semi-cure the curable resin composition and use the semi-cured resin composition, as required.

The curable film of the present invention is obtained by removing the base material from the base-material-attached curable resin composition of the present invention. The method of removing the base material is typically etching or peeling-off.

The above curable film can be used, for example, as an adhesive film.

A base-material-attached cured product is obtained according to the present invention. The base-material-attached cured product of the present invention is obtained by curing the base-material-attached curable resin composition. The base-material-attached curable resin composition of the present invention is sufficiently cured even in the presence of oxygen. Curing conditions vary depending on the presence or absence of use of the polymerization initiator and the presence or absence of combinational use of other thermosetting resin. The temperature for curing is preferably 100 to 250° C. The period of time for curing is preferably 0.1 to 5 hours. Further, it is possible to apply pressure or use an inert gas such as nitrogen or argon as a curing atmosphere, if required. The method of heating is selected from known methods such as an oven or a press.

The base-material-attached cured product of the present invention can be used, for example, as a flexible printed wiring board material when a copper foil is used as the base material.

The film of the present invention is obtained by a method in which a base material is removed from the base-material-attached cured product which is obtained by curing the base-material-attached curable resin composition of the present invention, a method in which the curable film of the present invention is cured under heat, or other methods. As a method of removing the base material, for example, etching or peeling-off is used. The curable film of the present invention is sufficiently cured even in the presence of oxygen. Curing conditions vary depending on the presence or absence of use of the polymerization initiator and the presence or absence of combinational use of other thermosetting resin. The temperature for curing is preferably 100 to 250° C. The period of time for curing is preferably 0.1 to 5 hours. Further, it is possible to apply pressure or use an inert gas such as nitrogen or argon as a curing atmosphere, if required. The method of heating is selected from known methods such as an oven or a press.

The film of the present invention can be used, for example, as a film for condensers.

EXAMPLES

The present invention will be concretely explained with reference to Examples and Comparative Examples, hereinafter, while the present invention shall not be limited to these Examples. Measuring methods are as follows.

1) A number average molecular weight and a weight average molecular weight were obtained by a gel permeation chromatography (GPC) method. Data processing was carried out according to the GPC curve and molecular weight calibration curve of a sample. The molecular weight calibration curve was obtained by making an approximation of a relation between the molecular weight of a standard polystyrene and an elution time with the following equation, $$\text{Log } M = A_0 X^3 + A_1 X^2 + A_2 X + A_3 + A_4/X^2$$

wherein M: a molecular weight, X: an elution time—19 (minute), and A: a coefficient.

2) A hydroxyl group equivalent was determined from an absorption intensity at 3,600 cm$^{-1}$ in an IR analysis (solution cell method; cell thickness=1 mm) in which 2,6-dimethylphenol was used as a standard reference material and dry dichloromethane was used as a solvent.

3) A vinyl group equivalent was determined from an absorption intensity at 910 cm$^{-1}$ in an IR analysis (solution cell method; cell thickness=1 mm) in which 1-octene was used as a standard reference material and carbon disulfide was used as a solvent.

4) A glass transition temperature (Tg) was measured at a load of 2.5 g, at a distance between chucks of 10 mm and at a temperature-increasing rate of 10° C./min according to a TMA tensile method. A sample width was 3 mm.

5) With regard to dielectric constant and dielectric loss tangent, a film was cylindrically roll up and then measured for values of a dielectric constant and a dielectric loss tangent at a 10 GHz by a cavity resonator perturbation method.

6) Breaking strength was measured in accordance with JIS K-7127. A specimen type was 1B. A test speed was 100 mm/minute. Stress at a breaking time was calculated.

7) With regard to chemical resistance, a cured film was immersed in tetrahydrofuran (THF) at 25° C. for 1 hour and then the presence or absence of dissolution was observed (◯: Not dissolved, x: Dissolved).

8) With regard to flame retardancy, a film was cylindrically roll up and then tested in accordance with UL-94 standard thin material vertical firing test.

9) With regard to thermal expansion coefficient, measurement was carried out at a load of 2.5 g, at a distance between chucks of 10 mm and at a temperature-increasing rate of 10° C./min according to a TMA tensile method. An average thermal expansion coefficient from 50 to 100° C. was calculated. A sample width was 3 mm.

Synthetic Example 1

Synthesis of Bifunctional Phenylene Ether Oligomer

A longitudinally long reactor having a volume of 12 liters and equipped with a stirrer, a thermometer, an air-introducing tube and baffleplates was charged with 3.88 g (17.4 mmol) of CuBr$_2$, 0.75 g (4.4 mmol) of N,N'-di-t-butylethylenediamine, 28.04 g (277.6 mmol) of n-butyldimethylamine and 2,600 g of toluene. The mixture was stirred at a reaction temperature of 40° C. Separately, 129.32 g (0.48 mol) of 2,2',3,3',5,5'-hexamethyl-(1,1'-biphenyl)-4,4'-diol, 292.19 g (2.40 mol) of 2,6-dimethylphenol, 0.51 g (2.9 mmol) of N,N'-di-t-butylethylenediamine and 10.90 g (108.0 mmol) of n-butyldimethylamine were dissolved in 2,300 g of methanol, to obtain a mixed solution. The mixed solution was dropwise added to the mixture in the reactor over 230 minutes while carrying out bubbling with a nitrogen-air mixed gas having an oxygen concentration of 8% at a flow velocity of 5.2 L/min, and stirring was carried out. After the completion of the addition, 1,500 g of water in which 19.89 g (52.3 mmol) of tetrasodium ethylenediamine tetraacetate was dissolved was added to the stirred mixture to terminate the reaction. An aqueous layer and an organic layer were separated. Then, the organic layer was washed with 1N hydrochloric acid aqueous solution and then washed with pure water. The thus-obtained solution was concentrated to 50 wt % with an evaporator, to obtain 833.40 g of a toluene solution of a bifunctional phenylene ether oligomer (resin "A"). The resin "A" had a number average molecular weight of 930, a weight average molecular weight of 1,460 and a hydroxyl group equivalent of 465.

(Synthesis of Vinyl Compound)

A reactor equipped with a stirrer, a thermometer and a reflux tube was charged with 833.40 g of the toluene solution of the resin "A", 160.80 g of vinylbenzyl chloride (trade name CMS-P; supplied by Seimi Chemical Co., Ltd.), 1,600 g of methylene chloride, 12.95 g of benzyldimethylamine, 420 g of pure water and 175.9 g of 30.5 wt % NaOH aqueous solution. The mixture was stirred at a reaction temperature of 40° C. The stirring was carried out for 24 hours, and then an organic layer was washed with 1N hydrochloric acid aqueous solution and then washed with pure water. The thus-obtained solution was concentrated with an evaporator. The concentrated solution was dropped into methanol to obtain a solid. The solid was recovered by filtering, and the recovered solid was dried in vacuum to obtain 501.43 g of a vinyl compound "B". The vinyl compound "B" had a number average molecular weight of 1,165, a weight average molecular weight of 1,630 and a vinyl group equivalent of 595 g/vinyl group.

Synthetic Example 2

Synthesis of Bifunctional Phenylene Ether Oligomer

A longitudinally long reactor having a volume of 12 liters and equipped with a stirrer, a thermometer, an air-introducing tube and baffleplates was charged with 9.36 g (42.1 mmol) of CuBr$_2$, 1.81 g (10.5 mmol) of N,N'-di-t-butylethylenediamine, 67.77 g (671.0 mmol) of n-butyldimethylamine and 2,600 g of toluene. The mixture was stirred at a reaction temperature of 40° C. Separately, 129.32 g (0.48 mol) of 2,2',3,3',5,5'-hexamethyl-(1,1'-biphenyl)-4,4'-diol, 878.4 g (7.2 mol) of 2,6-dimethylphenol, 1.22 g (7.2 mmol) of N,N'-di-t-butylethylenediamine and 26.35 g (260.9 mmol) of n-butyldimethylamine were dissolved in 2,300 g of methanol, to obtain a mixed solution. The mixed solution was dropwise added to the mixture in the reactor over 230 minutes while carrying out bubbling with a nitrogen-air mixed gas having an oxygen concentration of 8% at a flow velocity of 5.2 L/min, and stirring was carried out. After the completion of the addition, 1,500 g of water in which 48.06 g (126.4 mmol) of tetrasodium ethylenediamine tetraacetate was dissolved was added to the stirred mixture to terminate the reaction. An aqueous layer and an organic layer were separated. Then, the organic layer was washed with 1N hydrochloric acid aqueous solution and then washed with pure water. The thus-obtained solution was concentrated to 50 wt % with an evaporator, to obtain 1,981 g of a toluene solution of a bifunctional phenylene ether oligomer (resin "C"). The resin "C" had a number average molecular weight of 1,975, a weight average molecular weight of 3,514 and a hydroxyl group equivalent of 990.

(Synthesis of Vinyl Compound)

A reactor equipped with a stirrer, a thermometer and a reflux tube was charged with 833.40 g of the toluene solution of the resin "C", 76.7 g of vinylbenzyl chloride (CMS-P), 1,600 g of methylene chloride, 6.2 g of benzyldimethylamine, 199.5 g of pure water and 83.6 g of 30.5 wt % NaOH aqueous solution. The mixture was stirred at a reaction temperature of 40° C. The stirring was carried out for 24 hours, and then an organic layer was washed with 1N hydrochloric acid aqueous solution and then washed with pure water. The thus-obtained solution was concentrated with an evaporator. The concentrated solution was dropped into methanol to obtain a solid. The solid was recovered by filtering, and the recovered solid was dried in vacuum to obtain 450.1 g of a vinyl compound "D". The vinyl compound "D" had a number average molecular weight of 2,250, a weight average molecular weight of 3,920 and a vinyl group equivalent of 1,189 g/vinyl group.

Synthetic Example 3

Synthesis of Bifunctional Phenylene Ether Oligomer

A longitudinally long reactor having a volume of 12 liters and equipped with a stirrer, a thermometer, an air-introducing tube and baffleplates was charged with 13.1 g (0.12 mol) of CuCl, 707.0 g (5.5 mol) of di-n-butylamine and 4,000 g of methyl ethyl ketone. The mixture was stirred at a reaction temperature of 40° C. A solution of 410.2 g (1.6 mol) of 4,4'-methylenebis(2,6-dimethylphenol) and 586.5 g (4.8 mol) of 2,6-dimethylphenol in 8,000 g of methyl ethyl ketone was dropwise added to the mixture in the reactor over 120 minutes while carrying out bubbling with 2 L/min of air, and stirring was carried out. A disodium dihydrogen ethylenediamine tetraacetate aqueous solution was added the stirred mixture to terminate the reaction. Then, washing was three times carried out with 1N hydrochloric acid aqueous solution and then washing was carried out with ion-exchanged water. The thus-obtained solution was concentrated with an evaporator and then dried under a reduced pressure, to obtain 946.6 g of a bifunctional phenylene ether oligomer (resin "E"). The resin "E" had a number average molecular weight of 801, a weight average molecular weight of 1,081 and a hydroxyl group equivalent of 455.

(Synthesis of Vinyl Compound)

A reactor equipped with a stirrer, a thermometer and a reflux tube was charged with 480.0 g of the resin "E", 260.2 g of vinylbenzyl chloride (CMS-P), 2,000 g of tetrahydrofuran, 240.1 g of potassium carbonate and 60.0 g of 18-crown-6-ether. The mixture was stirred at a reaction temperature of 30° C. The stirring was carried out for 6 hours. Then, the mixture was concentrated with an evaporator, diluted with 2,000 g of toluene and then washed with water. An organic layer was concentrated and then dropped into methanol to obtain a solid. The solid was recovered by filtering, and the recovered solid was dried in vacuum to obtain 392.2 g of a vinyl compound "F". The vinyl compound "F" had a number average molecular weight of 988, a weight average molecular weight of 1,420 and a vinyl group equivalent of 588 g/vinyl group.

Synthetic Example 4

Synthesis of Bifunctional Phenylene Ether Oligomer

A longitudinally long reactor having a volume of 12 liters and equipped with a stirrer, a thermometer, an air-introducing tube and baffleplates was charged with 13.1 g (0.12 mol) of CuCl, 707.0 g (5.5 mol) of di-n-butylamine and 4,000 g of methyl ethyl ketone. The mixture was stirred at a reaction temperature of 40° C. A solution of 82.1 g (0.32 mol) of 4,4'-methylenebis(2,6-dimethylphenol) and 586.5 g (4.8 mol) of 2,6-dimethylphenol in 8,000 g of methyl ethyl ketone was dropwise added to the mixture in the reactor over 120 minutes while carrying out bubbling with 2 L/min of air, and stirring was carried out. A disodium dihydrogen ethylenediamine tetraacetate aqueous solution was added to the stirred mixture, to terminate the reaction. Then, washing was three times carried out with 1N hydrochloric acid aqueous solution and then washing was carried out with ion-exchanged water. The thus-obtained solution was concentrated with an evaporator and then dried under a reduced pressure, to obtain 632.5 g of a bifunctional phenylene ether oligomer (resin "G"). The resin "G" had a number average molecular weight of 1,884, a weight average molecular weight of 3,763 and a hydroxyl group equivalent of 840.

(Synthesis of Vinyl Compound)

A reactor equipped with a stirrer, a thermometer and a reflux tube was charged with 480.0 g of the resin "G", 140.5 g of vinylbenzyl chloride (CMS-P), 2,000 g of tetrahydrofuran, 129.6 g of potassium carbonate and 32.4 g of 18-crown-6-ether. The mixture was stirred at a reaction temperature of 30° C. The stirring was carried out for 6 hours. Then, the mixture was concentrated with an evaporator, diluted with 2,000 g of toluene and then washed with water. An organic layer was concentrated and then dropped into methanol to obtain a solid. The solid was recovered by filtering, and the recovered solid was dried in vacuum to obtain 415.3 g of a vinyl compound "H". The vinyl compound "H" had a number average molecular weight of 2,128, a weight average molecular weight of 4,021 and a vinyl group equivalent of 1,205 g/vinyl group.

Synthetic Example 5

Synthesis of Bifunctional Phenylene Ether Oligomer

A longitudinally long reactor having a volume of 2 liters and equipped with a stirrer, a thermometer, an air-introducing tube and baffleplates was charged with 18.0 g (78.8 mmol) of 2,2-bis(4-hydroxyphenyl)propane(bisphenol A), 0.172 g (0.77 mmol) of $CuBr_2$, 0.199 g (1.15 mmol) of N,N'-di-t-butylethylenediamine, 2.10 g (2.07 mmol) of n-butyldimethylamine, 139 g of methanol and 279 g of toluene. Separately, 48.17 g (0.394 mol) of 2,6-dimethylphenol, 0.245 g (1.44 mmol) of N,N'-di-t-butylethylenediamine and 2.628 g (25.9 mmol) of n-butyldimethylamine were dissolved in 133 g of methanol and 266 g of toluene, to obtain a mixed solution. The mixed solution was dropwise added to the reactor, in which the mixture was stirred at a liquid temperature of 40°

C., over 132 minutes while carrying out bubbling with air at an air flow velocity of 0.5 L/min. After the completion of the addition of the mixed solution, the resultant mixture was further stirred for 120 minutes. Then, 400 g of water in which 2.40 g of tetrasodium ethylenediamine tetraacetate was dissolved was added to the stirred mixture to terminate the reaction. An aqueous layer and an organic layer were separated. Then, washing with pure water was carried out. The thus-obtained solution was concentrated with an evaporator. The concentrated solution was dried in vacuum at 120° C. for 3 hours, to obtain 54.8 g of a bifunctional phenylene ether oligomer (resin "I"). The resin "I" had a number average molecular weight of 1,348, a weight average molecular weight of 3,267 and a hydroxyl group equivalent of 503.

(Synthesis of Vinyl Compound)

A 1 L separable flask equipped with a stirrer, a thermometer, a reflux tube and a dropping funnel was charged with 25.0 g of the resin "I", 8.69 g of vinylbenzyl chloride (trade name CMS-P; supplied by Seimi Chemical Co., Ltd.) and 100.0 g of dimethylformamide. 10.91 g of 28 wt % sodium methoxide (methanol solution) was dropwise added from the dropping funnel to the mixture over 20 minutes while stirring the mixture under heat at 50° C. After the completion of the dropping, the resultant mixture was further stirred at 50° C. for 1 hour. 1.99 g of 28 wt % sodium methoxide (methanol solution) was added to the reactor, and the resultant mixture was heated up to 60° C. and stirred for 3 hours. Further, 1.11 g of 85 wt % phosphoric acid was added to the reactor. The resultant mixture was stirred for 10 minutes and then cooled to 40° C. The reaction mixture was dropped into 150 g of pure water, to obtain a solid. The solid was recovered by suction filtration. Then, the solid was washed with 200 g of pure water two times and washed with 200 g of methanol three times. The washed solid was dried in vacuum at 60° C. for 30 hours, to obtain 28.25 g of a vinyl compound "J". The vinyl compound "J" had a number average molecular weight of 1,435, a weight average molecular weight of 3,158 and a vinyl group equivalent of 612 g/vinyl group.

Synthetic Example 6

Synthesis of Bifunctional Phenylene Ether Oligomer

A longitudinally long reactor having a volume of 12 liters and equipped with a stirrer, a thermometer, an air-introducing tube and baffleplates was charged with 3.88 g (17.4 mmol) of $CuBr_2$, 0.75 g (4.4 mmol) of N,N'-di-t-butylethylenediamine, 28.04 g (277.6 mmol) of n-butyldimethylamine and 2,600 g of toluene. The mixture was stirred at a reaction temperature of 40° C. Separately, 129.3 g (0.48 mol) of 2,2',3,3',5,5'-hexamethyl-(1,1'-biphenyl)-4,4'-diol, 233.7 g (1.92 mol) of 2,6-dimethylphenol, 64.9 g (0.48 mol) of 2,3,6-trimethylphenol, 0.51 g (2.9 mmol) of N,N'-di-t-butylethylenediamine and 10.90 g (108.0 mmol) of n-butyldimethylamine were dissolved in 2,300 g of methanol, to obtain a mixed solution. The mixed solution was dropwise added to the mixture in the reactor over 230 minutes while carrying out bubbling with a nitrogen-air mixed gas having an oxygen concentration of 8% at a flow velocity of 5.2 L/min, and stirring was carried out. After the completion of the addition, 1,500 g of water in which 19.89 g (52.3 mmol) of tetrasodium ethylenediamine tetraacetate was dissolved was added to the stirred mixture to terminate the reaction. An aqueous layer and an organic layer were separated. The organic layer was washed with 1N hydrochloric acid aqueous solution and then washed with pure water. The thus-obtained solution was concentrated to 50 wt % with an evaporator, to obtain 836.5 g of a toluene solution of a bifunctional phenylene ether oligomer (resin "K"). The resin "K" had a number average molecular weight of 986, a weight average molecular weight of 1,530 and a hydroxyl group equivalent of 471.

(Synthesis of Vinyl Compound)

A reactor equipped with a stirrer, a thermometer and a reflux tube was charged with 836.5 g of the toluene solution of the resin "K", 162.6 g of vinylbenzyl chloride (trade name CMS-P; supplied by Seimi Chemical Co., Ltd.), 1,600 g of methylene chloride, 12.95 g of benzyldimethylamine, 420 g of pure water and 178.0 g of 30.5 wt % NaOH aqueous solution. The mixture was stirred at a reaction temperature of 40° C. The stirring was carried out for 24 hours. Then, an organic layer was washed with 1N hydrochloric acid aqueous solution and then washed with pure water. The thus-obtained solution was concentrated with an evaporator, and the concentrated solution was dropped into methanol to obtain a solid. The solid was recovered by filtering, and the recovered solid was dried in vacuum to obtain 503.5 g of a vinyl compound "L". The vinyl compound "L" had a number average molecular weight of 1,187, a weight average molecular weight of 1,675 and a vinyl group equivalent of 590 g/vinyl group.

Comparative Synthetic Example 1

Synthesis of Vinylbenzyl Ether Compound of Naphthol Aralkyl Resin

A 1 L round-shape reactor having a magnetic stirrer, a Dimroth condenser tube, a thermometer and a dropping funnel was charged with 40 g (hydroxyl group 0.194 mol) of a naphthol aralkyl resin (SN475, supplied by Nippon Steel Chemical Co., Ltd.), 37.0 g (0.233 mol) of vinylbenzyl chloride (trade name CMS-P; supplied by Seimi Chemical Co., Ltd.) and 200 g of dimethylformamide. The atmosphere in the reactor was replaced with nitrogen. Then, the mixture was stirred at a reaction temperature of 50° C. 46.2 g (sodium methoxide 0.233 mol) of 28.4 wt % sodium methoxide methanol solution was placed in the dropping funnel. The sodium methoxide methanol solution was added to the reactor over 30 minutes. The resultant mixture was stirred at 50° C. for 1 hour. 3.9 g (sodium methoxide 0.021 mol) of additional 28.4 wt % sodium methoxide methanol solution was dropwise added to the reactor. After the completion of the dropping, the mixture was stirred at 60° C. for 4.5 hours to allow the mixture to react. 2.3 g (0.021 mol) of 85 wt % phosphoric acid aqueous solution was dropwise added and the mixture was stirred for 10 minutes. It was confirmed that its pH was 7. A salt generated was removed by suction filtration. Then, the reaction mixture was dropped into 2,500 g of methanol over 5 minutes, to obtain a solid. The solid was recovered by suction filtration. Then, the solid was dried with a vacuum dryer at 50° C. for 10 hours, to obtain 38.4 g of a vinyl compound "M". The solid was subjected to an IR analysis and an NMR analysis. The conversion of functional groups was confirmed from the disappearance of an absorption peak (3600 cm-1) of a phenolic hydroxyl group in the IR analysis and the appearance of a peak (4.6-5.8 ppm) derived from vinylbenzyl ether in the NMR analysis. The polyvinyl compound "M" was measured by a gel permeation chromatography (GPC) method. As a result thereof, the polyvinyl compound "M" had a number average molecular weight of 658, a weight average molecular weight of 4,534 and a vinyl group equivalent of 325 g/vinyl group.

Examples 1 to 9 and Comparative Examples 1 to 8

One of the vinyl compounds "B", "D", "F", "H", "J", "L" and "M" obtained in Synthetic Examples 1, 2, 3, 4, 5, 6 and Comparative Synthetic Example 1 and a maleimide compound were placed in a separable flask having a stirrer in accordance with weight ratios shown in Table 1 or Table 2. N,N-dimethylacetamide was added to the mixture such that the mixture had a solid content concentration of 20 wt %. The mixture was heated to 60° C. and stirred for 1 hour, to prepare a solution of a curable resin composition. The solution was applied to a shiny surface of an 18-μm electrolytic copper foil (3EC-III, supplied by Mitsui Mining and Smelting Co., Ltd.) with a doctor blade (gap 200 μm). The applied solution was air-dried at room temperature for 10 minutes and then dried with an air blowing dryer at 50° C. for 20 minutes, to obtain a base-material-attached curable resin composition, which had a resin layer thickness of about 15 μm. Then, the base-material-attached curable resin composition was heated in air with an air blowing dryer at 200° C. for 30 minutes, to obtain a base-material-attached cured product. Then, the copper foil as the base material was removed by etching, to obtain a film. The film had a thickness of about 15 μm. The film was measured and evaluated for a glass transition temperature, a dielectric constant, a dielectric loss tangent, mechanical properties and chemical resistance. Tables 1 and 2 show the results thereof.

TABLE 1

| | | Ex.1 | Ex.2 | Ex.3 | Ex.4 | Ex.5 | Ex.6 | Ex.7 | Ex.8 | Ex.9 |
|---|---|---|---|---|---|---|---|---|---|---|
| Vinyl Compound | Resin B | 72.4 | 56.4 | 39.3 | — | — | — | — | — | 76.3 |
| | Resin D | — | — | — | 70.4 | — | — | — | — | — |
| | Resin F | — | — | — | — | 56.4 | — | — | — | — |
| | Resin H | — | — | — | — | — | 70.4 | — | — | — |
| | Resin J | — | — | — | — | — | — | 56.4 | — | — |
| | Resin L | — | — | — | — | — | — | — | 56.4 | — |
| | Resin M | — | — | — | — | — | — | — | — | — |
| Maleimide compound | BMI-80 | 27.6 | 43.6 | 60.7 | 29.6 | 43.6 | 29.6 | 43.6 | 43.6 | — |
| | BMI-2300 | — | — | — | — | — | — | — | — | 23.7 |
| | N-phenyl maleimide | — | — | — | — | — | — | — | — | — |
| | BMI-7000 | — | — | — | — | — | — | — | — | — |
| Mixing ratio | Vinyl group: Maleimide group | 1:0.8 | 1:1.6 | 1:3.2 | 1:1.6 | 1:1.6 | 1:1.6 | 1:1.6 | 1:1.6 | 1:2 |
| Thermal properties | Tg (° C.) | 218 | 231 | 216 | 220 | 230 | 220 | 225 | 228 | 212 |
| Dielectric characteristics | Dielectric constant (10 GHz) | 2.48 | 2.49 | 2.50 | 2.47 | 2.50 | 2.47 | 2.51 | 2.48 | 2.53 |
| | Dielectric loss tangent (10 GHz) | 0.0040 | 0.0042 | 0.0045 | 0.0038 | 0.0043 | 0.0037 | 0.0045 | 0.0044 | 0.0049 |
| Mechanical properties | Breaking strength (MPa) | 28 | 41 | 33 | 68 | 43 | 65 | 33 | 31 | 20 |
| Chemical resistance | THF resistance | ○ | ○ | ○ | ○ | ○ | ○ | ○ | ○ | ○ |

Tg = glass transition temperature,
Ex. = Example,
THF = tetrahydrofuran

TABLE 2

| | | CEx.1 | CEx.2 | CEx.3 | CEx.4 | CEx.5 | CEx.6 | CEx.7 | CEx.8 |
|---|---|---|---|---|---|---|---|---|---|
| Vinyl Compound | Resin B | 100 | 77.8 | — | — | — | — | 81 | — |
| | Resin D | — | — | 100 | — | — | — | — | 88.6 |
| | Resin F | — | — | — | — | — | — | — | — |
| | Resin H | — | — | — | — | — | — | — | — |
| | Resin J | — | — | — | — | — | — | — | — |
| | Resin L | — | — | — | — | — | — | — | — |
| | Resin M | — | — | — | 65.1 | 41.0 | — | — | — |
| Maleimide compound | BMI-80 | — | — | — | — | 59.0 | 100 | — | — |
| | BMI-2300 | — | — | — | — | — | — | — | — |
| | N-phenyl maleimide | — | 22.2 | — | 34.9 | — | — | — | — |
| | BMI-7000 | — | — | — | — | — | — | 19 | 11.4 |
| Mixing ratio | Vinyl group: Maleimide group | 1:0 | 1:1 | 1:0 | 1:1 | 1:1.6 | 0:1 | 1:1 | 1:1 |
| Thermal properties | Tg (° C.) | Unmeasurable | Unmeasurable | Unmeasurable | Unmeasurable | 220 | Unmeasurable | Unmeasurable | Unmeasurable |
| Dielectric characteristics | Dielectric constant (10 GHz) | Unmeasurable | Unmeasurable | Unmeasurable | Unmeasurable | 2.72 | Unmeasurable | Unmeasurable | Unmeasurable |
| | Dielectric loss tangent (10 GHz) | Unmeasurable | Unmeasurable | Unmeasurable | Unmeasurable | 0.0075 | Unmeasurable | Unmeasurable | Unmeasurable |
| Mechanical properties | Breaking strength (MPa) | Unmeasurable | Unmeasurable | Unmeasurable | Unmeasurable | 8 | Unmeasurable | Unmeasurable | Unmeasurable |
| Chemical resistance | THF resistance | X | X | X | X | ○ | X | ○ | ○ |

Tg = glass transition temperature,
CEx. = Comparative Example,
THF = tetrahydrofuran BMI-80: 2,2'-bis-[4-(4-maleimidophenoxy)phenyl] propane (supplied by K I KASEI KK, maleimide group equivalent: 285 g/maleimide group).

BMI-2300: a polycondensate of aniline, formaldehyde and maleic anhydride (supplied by Daiwakasei Industry Co., Ltd., maleimide group equivalent: 179 g/maleimide group).

30 minutes, to obtain a base-material-attached cured product. Then, the ETFE film as the base material was peeled off by hand, to obtain a film. The film was measured and evaluated for a glass transition temperature, a dielectric constant, a dielectric loss tangent, mechanical properties and chemical resistance. Table 3 shows the results thereof.

TABLE 3

|  |  | Ex. 10 | Ex. 11 | Ex. 12 | Ex. 13 | CEx. 9 |
|---|---|---|---|---|---|---|
| Vinyl Compound | Resin B | 51.2 | 42.6 | 55.4 | 44.2 | 50 |
| Maleimide compound | BMI-70 | 18.8 | 14.8 | — | — | — |
|  | BMI-TMH | — | — | 14.6 | 11.6 | — |
| Styrenic thermoplastic elastomer | S8007L | 30 | 42.6 | 30 | 44.2 | 50 |
| Mixing ratio | Vinyl group:Maleimide group | 1:1 | 1:1 | 1:1 | 1:1 | 1:0 |
| Thermal properties | Tg (° C.) | 198 | 180 | 182 | 176 | 143 |
| Dielectric characteristics | Dielectric constant (10 GHz) | 2.40 | 2.38 | 2.42 | 2.40 | 2.35 |
|  | Dielectric loss tangent (10 GHz) | 0.0045 | 0.0040 | 0.0043 | 0.0041 | 0.0040 |
| Mechanical properties | Breaking strength (MPa) | 20 | 18 | 22 | 19 | 20 |
| Chemical resistance | THF resistance | ○ | ○ | ○ | ○ | X |

Tg = glass transition temperature,
Ex. = Example,
CEx. = Comparative Example,
THF = tetrahydrofuran BMI-7000: 4-methyl-1,3-phenylenebismaleimide (supplied by Daiwakasei Industry Co., Ltd., maleimide group equivalent: 141 g/maleimide group).

"Unmeasurable" in Table 2 represents that samples for measurement could not be prepared since cured products were fragile.

From Examples 1 to 7 and Comparative Examples 1 to 8, it has been found that owing to combining vinyl compounds having a phenylene ether structure with maleimide compounds having a specific structure, resultant resin compositions can be cured in the presence of oxygen and also can give cured products having high heat resistance, low dielectric characteristics, excellent mechanical properties and excellent chemical resistance.

Examples 10-13, Comparative Example 9

The vinyl compound "B" obtained in Synthetic Example 1, a maleimide compound and a styrenic thermoplastic elastomer in weight ratios shown in Table 3 were placed in a separable flask equipped with a stirrer. Toluene was added to the mixture such that the mixture had a solid content concentration of 20 wt %. The resultant mixture was heated to 60° C. and stirred for 1 hour, thereby preparing a solution of a curable resin composition. The solution was applied to an ethylene tetrafluoroethylene copolymer (ETFE) film having a thickness of 50 μm with a doctor blade (gap 200 μm). The applied solution was air-dried at room temperature for 10 minutes and then dried with an air blowing dryer at 50° C. for 20 minutes, to obtain a base-material-attached curable resin composition, which had a resin layer thickness of about 15 μm. Then, the base-material-attached curable resin composition was heated in air with an air blowing dryer at 200° C. for BMI-70: 3,3'-dimethyl-5,5'-diethyl-4,4'-diphenylmethane bismaleimide (supplied by K I KASEI KK, maleimide group equivalent: 221 g/maleimide group).

BMI-TMH: 1,6-bismaleimide-(2,2,4-trimethyl)hexane (supplied by Daiwakasei Industry Co., Ltd., maleimide group equivalent: 159 g/maleimide group).

S8007L: hydrogenated styrene butadiene styrene copolymer (SEBS) (supplied by KURARAY Co., Ltd.: weight average molecular weight about 100,000, styrene content 30 wt %).

From Examples 10 to 13 and Comparative Example 9, it has been found that owing to combining vinyl compounds having a phenylene ether structure with maleimide compounds having a specific structure and, further, styrenic thermoplastic elastomers, resultant resin compositions can be cured in the presence of oxygen and also can give cured products having low dielectric characteristics, high heat resistance, excellent mechanical properties and excellent chemical resistance.

Examples 14 to 15 and Comparative Examples 10 to 11

The vinyl compound "D obtained in Synthetic Example 2, a maleimide compound and a styrenic thermoplastic elastomer were placed in weight ratios shown in Table 4 in a separable flask equipped with a stirrer. Toluene was added to the mixture such that the mixture had a solid content concentration of 20 wt %. The resultant mixture was heated to 60° C. and stirred for 1 hour, thereby preparing a solution of a curable resin composition. The solution was applied to an ethylene tetrafluoroethylene copolymer (ETFE) film having a thickness of 50 μm with a doctor blade (gap 200 μm). The applied solution was air-dried at room temperature for 10 minutes and then dried with an air blowing dryer at 50° C. for 20 minutes, to obtain a base-material-attached curable resin composition, which had a resin layer thickness of about 15 μm. Then, the base-material-attached curable resin composition was heated in nitrogen with an inert oven at 150° C. for 2 hours or at 200° C. for 30 minutes, to obtain a base-material-attached cured product. Then, the ETFE film was peeled off by hand, to obtain a film. The film was measured and evaluated for a glass transition temperature, a dielectric constant, a dielectric loss tangent, mechanical properties and chemical resistance. Table 4 shows the results thereof.

TABLE 4

| | | Ex. 14 | Ex. 15 | CEx. 10 | CEx. 11 |
|---|---|---|---|---|---|
| Vinyl Compound | Resin D | 45.7 | | 50 | |
| Maleimide compound | BMI-70 | 8.6 | | — | |
| Styrenic thermoplastic elastomer | S8007L | 45.7 | | 50 | |
| Mixing ratio | Vinyl group: Maleimide group | 1:1 | | 1:0 | |
| | Curing temperature | 150° C. | 200° C. | 150° C. | 200° C. |
| Thermal properties | Tg (° C.) | 170 | 204 | 148 | 188 |
| Dielectric characteristics | Dielectric constant (10 GHz) | 2.30 | 2.29 | 2.35 | 2.33 |
| | Dielectric loss tangent (10 GHz) | 0.0014 | 0.0012 | 0.0015 | 0.0013 |
| Mechanical properties | Breaking strength (MPa) | 30 | 43 | 16 | 31 |

TABLE 4-continued

| | | Ex. 14 | Ex. 15 | CEx. 10 | CEx. 11 |
|---|---|---|---|---|---|
| Chemical resistance | THF resistance | ○ | ○ | X | ○ |

Tg = glass transition temperature,
Ex. = Example,
CEx. = Comparative Example,
THF = tetrahydrofuran From Table 4, it has been found that owing to incorporation of a maleimide compound, resultant resin compositions can be cured at low temperatures and also can give cured products having low dielectric characteristics, high heat resistance, excellent mechanical properties and excellent chemical resistance.

Examples 16 to 19 and Comparative Example 12

The vinyl compounds "B" obtained in Synthetic Example 1 and/or "F" obtained in Synthetic Example 3, a maleimide compound and a styrenic thermoplastic elastomer in weight ratios shown in Table 5 were placed in a separable flask equipped with a stirrer. Tetrahydrofuran was added to the mixture such that the mixture had a solid content concentration of 20 wt %. The resultant mixture was heated to 60° C. and stirred for 1 hour, thereby preparing a solution of a curable resin composition. The solution was applied to a shiny surface of an 18-μm electrolytic copper foil (3EC-III, supplied by Mitsui Mining and Smelting Co., Ltd.) with a doctor blade (gap 200 μm). The applied solution was air-dried at room temperature for 10 minutes and then dried with an air blowing dryer at 50° C. for 20 minutes, to obtain a base-material-attached curable resin composition, which had a resin layer thickness of about 15 μm. Then, the base-material-attached curable resin composition was heated in air with an air blowing dryer at 150° C. for 2 hours, to obtain a base-material-attached cured product. Then, the copper foil as the base material was removed by etching, to obtain a film. The film was measured and evaluated for a glass transition temperature, a dielectric constant, a dielectric loss tangent, mechanical properties and chemical resistance. Table 5 shows the results thereof.

TABLE 5

| | | Ex. 16 | Ex. 17 | Ex. 18 | Ex. 19 | CEx. 12 |
|---|---|---|---|---|---|---|
| Vinyl Compound | Resin B | 39.4 | 46.6 | 19.7 | 44.1 | 70 |
| | Resin F | — | — | 19.7 | — | — |
| Maleimide compound | BMI-80 | 30.6 | 15.3 | 30.6 | 20.9 | — |
| | BMI-2300 | — | 8.1 | — | — | — |
| Styrenic thermoplastic elastomer | S8007L | 30 | 30 | 30 | 35 | 30 |
| Mixing ratio | Vinyl group:Maleimide group | 1:1.6 | 1:1.46 | 1:1.6 | 1:1 | 1:0 |
| Thermal properties | Tg (° C.) | 188 | 182 | 185 | 181 | 122 |
| Dielectric characteristics | Dielectric constant (10 GHz) | 2.41 | 2.41 | 2.42 | 2.37 | 2.39 |
| | Dielectric loss tangent (10 GHz) | 0.0023 | 0.0025 | 0.0024 | 0.0021 | 0.0023 |
| Mechanical properties | Breaking strength (MPa) | 21 | 22 | 20 | 20 | 15 |
| Chemical resistance | THF resistance | ○ | ○ | ○ | ○ | X |

Tg = glass transition temperature,
Ex. = Example,
CEx. = Comparative Example,
THF = tetrahydrofuran From Examples 16 to 19 and Comparative Example 12, it has been found that owing to combining vinyl compounds having a phenylene ether structure with maleimide compounds having a specific structure and styrenic thermoplastic elastomer, resultant resin compositions can be cured at low temperatures in the presence of oxygen and also can give cured products having low dielectric characteristics, high heat resistance, excellent mechanical properties and excellent chemical resistance.

Example 20

Formation of Buildup Layer

The same curable resin composition toluene solution (resin solid content 20 wt %) as the toluene solution of the curable resin composition prepared in Example 10 was applied to a mat surface of an 18-μm electrolytic copper foil (3EC-III) with a doctor blade (gap 400 μm). The applied solution was air-dried at room temperature for 10 minutes and then dried with an air blowing dryer at 80° C. for 20 minutes, to obtain base-material-attached curable resin compositions having a resin layer thickness of about 40 μm each. The base-material-attached curable resin compositions were placed on both surfaces, one resin composition on each surface, of a core material (EL190, copper foil thickness 18 μm, supplied by Mitsubishi Gas Chemical Co., Inc.) having patterns of line/space=100 μm/100 μm on its both surfaces. The resin compositions were cured under heat at 170° C. and under pressure at 2 MPa for 2 hours, thereby obtaining a four-layered board. The copper foil peeling strength of the outermost copper foils was 0.8 kN/m. Further, the copper foils were removed by etching. Then, it was found that internal layer patterns were buried without any voids.

Example 21

Production of Multilayer Board

The same curable resin composition toluene solution (resin solid content 20 wt %) as the toluene solution of the curable resin composition prepared in Example 11 was applied to an ethylene tetrafluoroethylene copolymer (ETFE) film having a thickness of 50 μm with a doctor blade (gap 400 μm). The applied solution was air-dried at room temperature for 10 minutes and then dried with an air blowing dryer at 50° C. for 20 minutes, to obtain a base-material-attached curable resin composition which had a resin layer thickness of about 50 μm. Then, the ETFE film was peeled off from the base-material-attached curable resin composition by hand, to obtain a curable film. The curable film was sandwiched between two core materials, each of which had a pattern of line/space=100 μm/100 μm on one surface, (HL832, copper foil thickness 12 μm, supplied by Mitsubishi Gas Chemical Co., Inc.) such that the patterned surfaces of the core materials were brought into contact with the curable film. The curable film was cured under heat at 170° C. and under pressure at 2 MPa for 2 hours, to bond the core materials to each other. A cross section was observed through a microscope. Then, it was found that internal layer patterns were buried without any voids.

Examples 22 and 23

The vinyl compound "B" obtained in Synthetic Example 1, a maleimide compound, a styrenic thermoplastic elastomer and a flame retardant in weight ratios shown in Table 6 were placed in a separable flask equipped with a stirrer. Tetrahydrofuran was added to the mixture such that the mixture had a solid content concentration of 20 wt %. The resultant mixture was heated to 60° C. and stirred for 1 hour, thereby preparing a solution of a flame-retardant curable resin composition for Example 22. Silica was added to the resin composition solution of Example 22 and these components were stirred and mixed, thereby preparing a solution of an inorganic-filler-containing curable resin composition for Example 23. The resin composition solution of Example 22 was applied to a shiny surface of an 18-μm electrolytic copper foil (3EC-III, supplied by Mitsui Mining and Smelting Co., Ltd.) with a doctor blade (gap 200 μm). The resin composition solution of Example 23 was applied to a shiny surface of an 18-μm electrolytic copper foil (3EC-III) with a doctor blade (gap 200 μm). The applied solution of Example 22 and the applied solution of Example 23 were independently air-dried at room temperature for 10 minutes and then dried with an air blowing dryer at 80° C. for 5 minutes, thereby obtaining base-material-attached curable resin compositions, respectively. Each of the base-material-attached curable resin compositions had a resin layer thickness of about 20 μm. Then, these base-material-attached curable resin compositions were heated in air with an air blowing dryer at 150° C. for 2 hours, thereby obtaining base-material-attached cured products, respectively. The copper foils as the base materials were removed by etching, thereby obtaining films, respectively. The films were measured and evaluated for a glass transition temperature, a dielectric constant, a dielectric loss tangent, mechanical properties, chemical resistance and flame retardancy. Table 6 shows the results thereof.

TABLE 6

|  |  | Ex. 22 | Ex. 23 |
|---|---|---|---|
| Vinyl Compound | Resin B | 29.3 | 14.7 |
| Maleimide compound | BMI-80 | 22.7 | 11.3 |
| Styrenic thermoplastic elastomer | S8007L | 28 | 14 |
| Flame retardant | PX200 | 20 | 10 |
| Filler | SC2050MR | — | 50 |
| Mixing ratio | Vinyl group:Maleimide group | 1:1.6 | 1:1.6 |
| Phosphorus content | wt % | 1.75 | 0.87 |
| Thermal properties | Tg (° C.) | 153 | 153 |
|  | Thermal expansion coefficient (ppm) | 100 | 44 |
| Dielectric characteristics | Dielectric constant (10 GHz) | 2.43 | 2.71 |
|  | Dielectric loss tangent (10 GHz) | 0.0023 | 0.0027 |
| Mechanical properties | Breaking strength (MPa) | 22 | 25 |
| Chemical resistance | THF resistance | ◯ | ◯ |
| Flame retardancy | UL-94 | VTM-0 | VTM-0 |

Tg = glass transition temperature,
Ex. = Example,
THF = tetrahydrofuran

PX200: 1,3-phenylenebis(2,6-di-xylenyl phosphate) (supplied by Daihachi Chemical Industry Co., Ltd.).
SC2050: fused silica (ADMAFINE SC-2050: supplied by Admatechs).

From Example 22, it has been found that owing to combining a vinyl compound having a phenylene ether structure with a maleimide compound having a specific structure, a styrenic thermoplastic elastomer and, further, a flame retardant, resultant resin composition can be cured at a low temperature in the presence of oxygen and also can give a cured product having low dielectric characteristics, high heat resistance, excellent mechanical properties, excellent chemical resistance and flame retardancy. Further, it has been found that owing to further incorporation of a filler, resultant resin composition can be cured at a low temperature in the presence of oxygen and also can give a cured product having low dielectric characteristics, high heat resistance, excellent mechanical properties, excellent chemical resistance, excellent flame retardancy and low thermal expansibility.

What is claimed is:

1. A curable resin composition containing a vinyl compound (a) represented by the formula (1) or a mixture of at least two kinds of vinyl compounds (a) of the formula (1) which are different in structure from each other,
   at least one maleimide compound (b) selected from the group consisting of maleimide compounds (b) represented by the formula (5) to the formula (8), and
   a phosphoric flame retardant (d), wherein the content of phosphorous in the curable resin composition is 0.1 to 5 wt %, and
   the weight ratio of the vinyl compound (a): the maleimide compound (b) is in the range of 1:0.4 to 1:0.8,

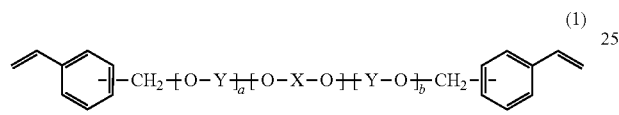

(1)

wherein —(O—X—O)— represents a moiety of the formula (2) or the formula (3), —(Y—O)— represents an arrangement of a moiety of the formula (4) or a random arrangement of at least two kinds of moieties of the formula (4), and each of a and b is an integer of from 0 to 100, provided that at least one of a and b is not 0,

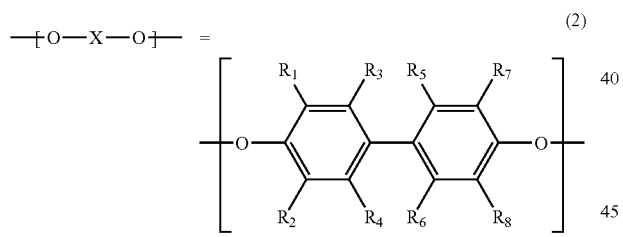

(2)

wherein $R_1$, $R_2$, $R_3$, $R_7$ and $R_8$ are the same or different and represent a halogen atom, an alkyl group having 6 or less carbon atoms or a phenyl group and $R_4$, $R_5$ and $R_6$ are the same or different and represent a hydrogen atom, a halogen atom, an alkyl group having 6 or less carbon atoms or a phenyl group,

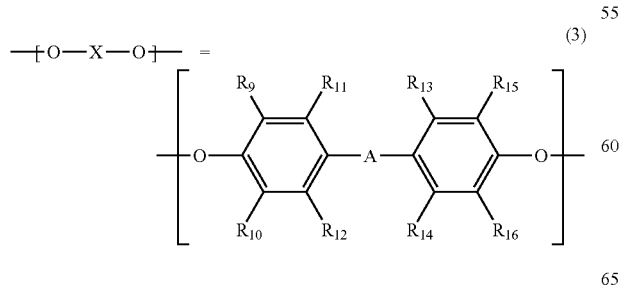

(3)

wherein $R_9$, $R_{10}$, $R_{11}$, $R_{12}$, $R_{13}$, $R_{14}$, $R_{15}$ and $R_{16}$ are the same or different and represent a hydrogen atom, a halo-
gen atom, an alkyl group having 6 or less carbon atoms or a phenyl group, and -A- represents a linear, branched or cyclic bivalent hydrocarbon group having 20 or less carbon atoms,

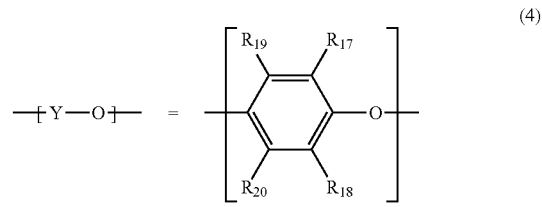

(4)

wherein $R_{17}$ and $R_{18}$ are the same or different and represent a halogen atom, an alkyl group having 6 or less carbon atoms or a phenyl group, and $R_{19}$ and $R_{20}$ are the same or different and represent a hydrogen atom, a halogen atom, an alkyl group having 6 or less carbon atoms or a phenyl group,

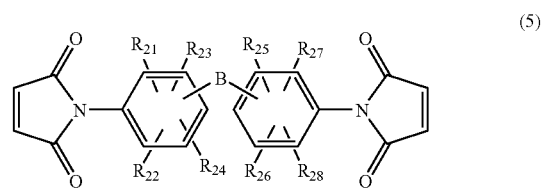

(5)

wherein $R_{21}$ to $R_{28}$ are the same or different and represent a hydrogen atom or an alkyl group having 6 or less carbon atoms, and B represents a single bond, a bivalent hydrocarbon group having 20 or less carbon atoms or an oxygen atom,

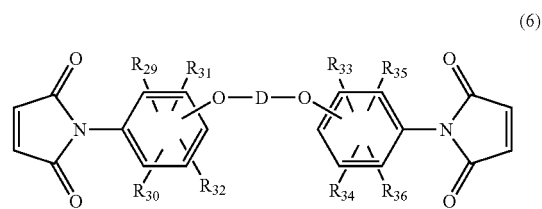

(6)

wherein $R_{29}$ to $R_{36}$ are the same or different and represent a hydrogen atom or an alkyl group having 6 or less carbon atoms, and D represents a bivalent hydrocarbon group having 20 or less carbon atoms,

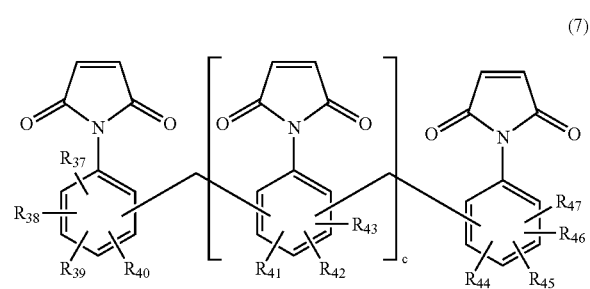

(7)

wherein $R_{37}$ to $R_{47}$ are the same or different and represent a hydrogen atom or an alkyl group having 6 or less carbon atoms and c is an integer of 1 to 20,

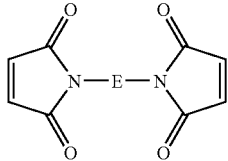
(8)

wherein E represents a bivalent aliphatic hydrocarbon group having 20 or less carbon atoms.

2. The curable resin composition according to claim 1, wherein in the vinyl compound (a), —(O—X—O)— is a moiety of the formula (9), the formula (10) or the formula (11) and —(Y—O)— is an arrangement of a moiety of the formula (12) or the formula (13) or a random arrangement of moieties of the formula (12) and the formula (13),

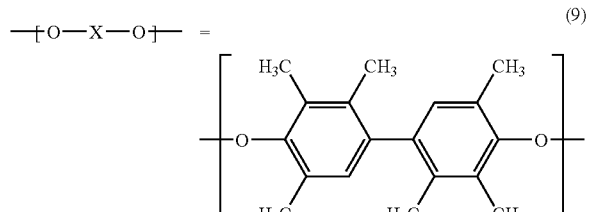
(9)

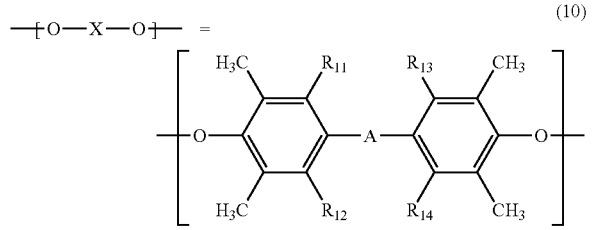
(10)

wherein $R_{11}$, $R_{12}$, $R_{13}$ and $R_{14}$ are the same or different and represent a hydrogen atom or a methyl group and -A- represents a linear, branched or cyclic bivalent hydrocarbon group having 20 or less carbon atoms,

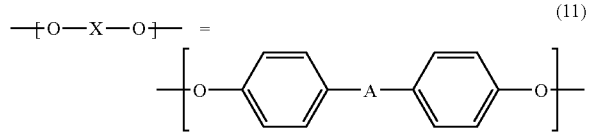
(11)

wherein -A- represents a linear, branched or cyclic bivalent hydrocarbon group having 20 or less carbon atoms,

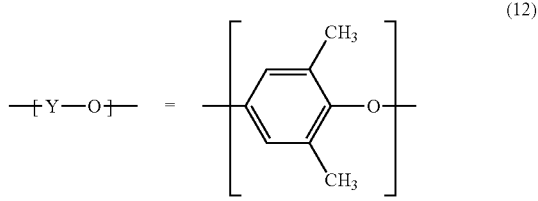
(12)

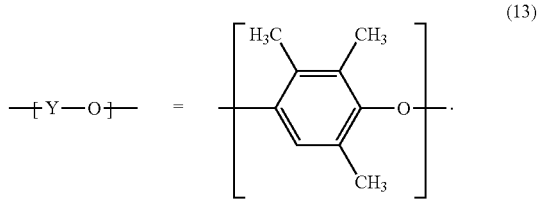
(13)

3. The curable resin composition according to claim 1, wherein the vinyl compound (a) has a number average molecular weight of 500 to 3,000 and a molecular weight distribution (weight average molecular weight/number average molecular weight) of 1 to 3.

4. The curable resin composition according to claim 1, wherein the molar ratio of a vinyl group of the vinyl compound (a): a maleimide group of the maleimide compound (b) is 1:0.1 to 1:5.

5. The curable resin composition according to claim 1, which further contains a styrenic thermoplastic elastomer (c).

6. The curable resin composition according to claim 1, wherein the phosphoric flame retardant is 1,3-phenylenebis (2,6-dixylenylphosphate).

7. The curable resin composition according to claim 1, which further contains a filler (e).

8. The curable resin composition according to claim 7, wherein the filler (e) is silica and the content of silica in the curable resin composition is 10 to 70 wt %.

9. A curable resin composition solution obtained by dissolving and dispersing the curable resin composition as defined in claim 1 into a solvent.

10. A cured product obtained by curing the curable resin composition as defined in claim 1.

11. A base-material-attached curable resin composition obtained by applying the curable resin composition as defined in claim 1 to a base material.

12. A base-material-attached cured product obtained by curing the base-material-attached curable resin composition as defined in claim 11.

13. A curable film obtained by removing the base material from the base-material-attached curable resin composition as defined in claim 11.

14. A film obtained by curing the curable resin composition as defined in claim 1 in a film form.

* * * * *